Figure 1:
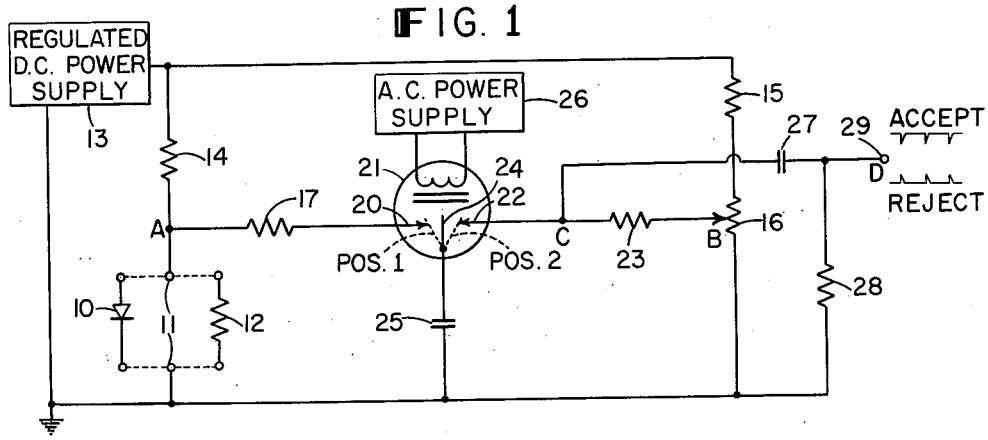

June 12, 1962 R. J. CONNORS 3,039,057
VOLTAGE COMPARISON APPARATUS
Filed Dec. 19, 1958 3 Sheets-Sheet 1

INVENTOR.
ROBERT J. CONNORS
BY
*Elmer J. Nealon*
ATTORNEY

June 12, 1962  R. J. CONNORS  3,039,057
VOLTAGE COMPARISON APPARATUS
Filed Dec. 19, 1958  3 Sheets-Sheet 2

INVENTOR.
ROBERT J. CONNORS
BY
Elmer J. Nealon
ATTORNEY.

June 12, 1962 R. J. CONNORS 3,039,057
VOLTAGE COMPARISON APPARATUS
Filed Dec. 19, 1958 3 Sheets-Sheet 3
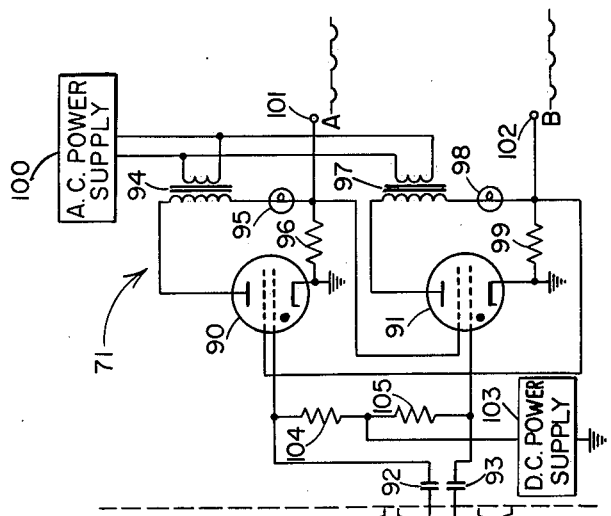
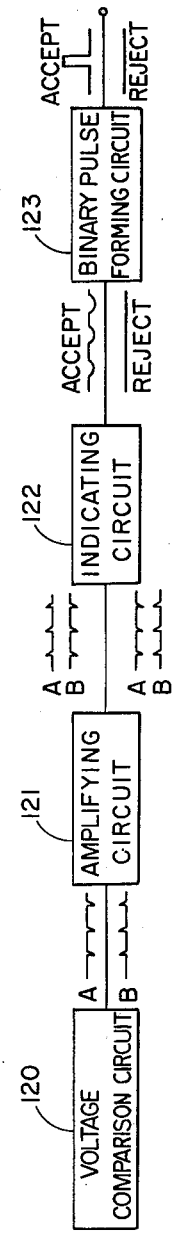
INVENTOR.
ROBERT J. CONNORS
BY
Elmer J. Nealon
ATTORNEY.

United States Patent Office 3,039,057
Patented June 12, 1962

3,039,057
VOLTAGE COMPARISON APPARATUS
Robert J. Connors, Natick, Mass., assignor, by mesne assignments, to Sylvania Electric Products Inc., Wilmington, Del., a corporation of Delaware
Filed Dec. 19, 1958, Ser. No. 781,791
7 Claims. (Cl. 324—158)

This invention relates to electrical test apparatus. More particularly it is concerned with apparatus for comparing one electrical voltage with another electrical voltage and for producing an output indicating whether the one voltage is less than or greater than the other voltage.

In checking and testing electrical circuits and components it is frequently desired to measure the direct current voltage across an element with a high degree of precision. The measuring and indicating equipments most generally used for making D.C. measurements draw sufficient current to introduce appreciable errors into precision measurements. Frequently, the desired degree of precision may be obtained by employing a so-called balanced bridge circuit in which the unknown voltage across an element is compared with that across a calibrated or standard element. These techniques as commonly employed, however, are not readily suited for use with automatic or semi-automatic apparatus wherein it is desired to perform routine testing within precise limits without requiring the exercise of human skill and judgment.

It is an object of the present invention to provide an improved apparatus for comparing the voltage across two elements.

It is another object of the invention to provide an improved apparatus for determining precisely and rapidly whether the direct current voltage across an element is greater or less than a known reference voltage.

Briefly, in accordance with the objects of the invention a voltage comparison apparatus is provided in which an electrical energy storage device is charged to the voltage across an element of electrical value to be determined and the voltage across the storage device is then changed to the voltage across another element of known electrical value. An output means responsive to the changing voltage across the storage device provides for positive electrical indication of the difference in voltages across the elements.

Additional objects, features, and advantages of the apparatus according to the invention will be apparent from the following detailed description and the accompanying drawings. In order to present the invention clearly and in a typical setting indicating its utility, apparatus for testing the forward conduction of semiconductor diodes is shown and described.

Figure 2A:
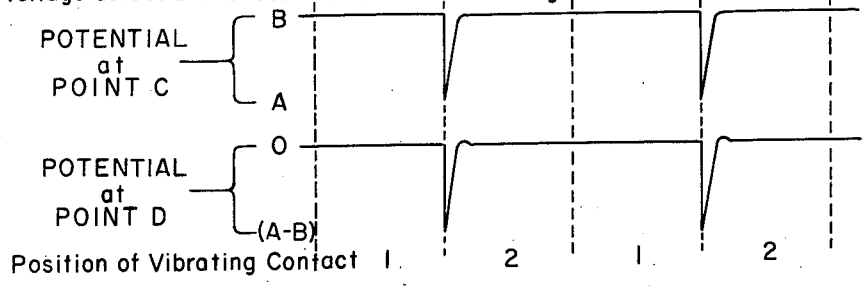
Figure 2B:
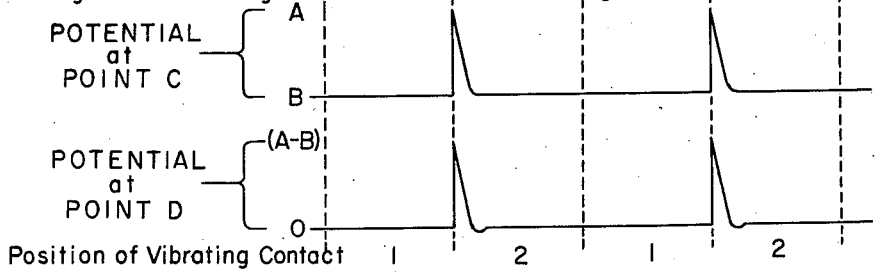
Figure 3:
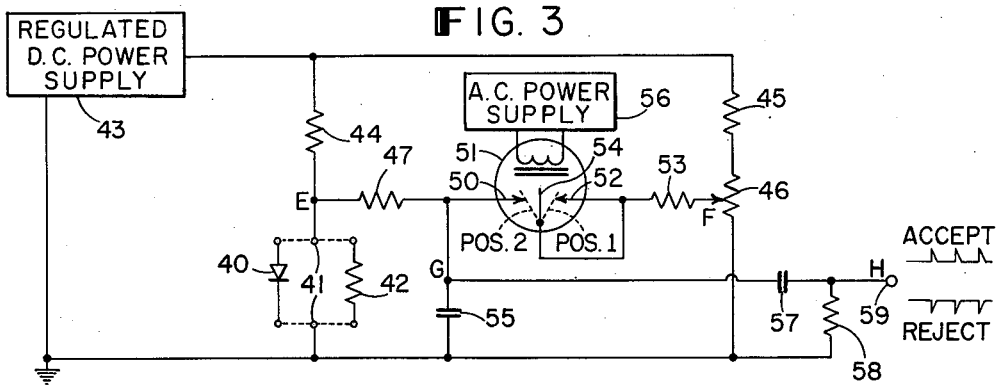
Figure 4A:
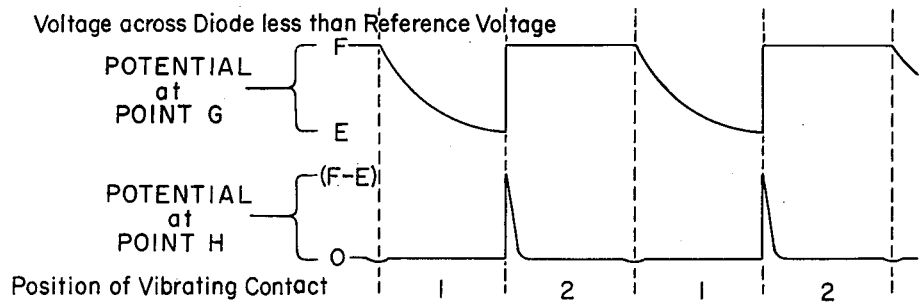
Figure 4B:
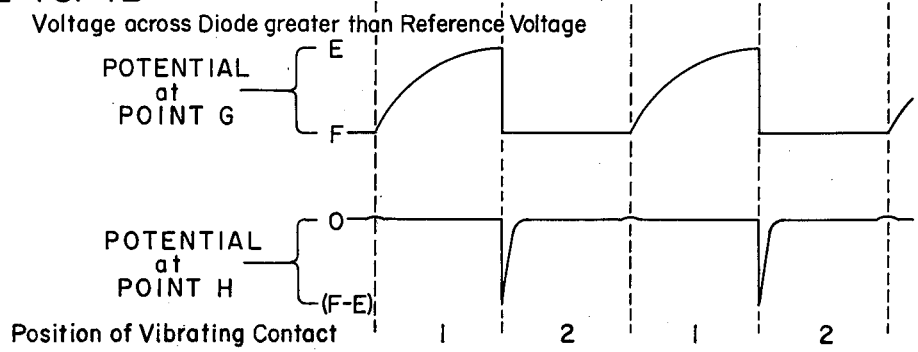

In the drawings:

FIG. 1 is a schematic circuit diagram of voltage comparison apparatus according to the invention utilized for testing the voltage across a semiconductor diode connected for forward conduction, FIG. 2A shows curves of voltages at points in the circuit of FIG. 1 for a diode under test exhibiting a forward voltage less than a predetermined reference voltage, FIG. 2B shows curves of voltages at points in the circuit of FIG. 1 for a diode under test exhibiting a forward voltage greater than a predetermined reference voltage, FIG. 3 is a schematic circuit diagram of an alternative apparatus according to the invention also utilized for testing the forward voltage across a semiconductor diode, FIG. 4A shows curves of voltages at points in the circuit of FIG. 3 for a diode under test exhibiting a forward voltage less than a predetermined reference voltage, FIG. 4B shows curves of voltages at points in the circuit of FIG. 3 for a diode under test exhibiting a forward voltage greater than a predetermined reference voltage, FIG. 5 is a schematic circuit diagram of one form of amplifier and indicator apparatus which may be employed with the voltage comparison circuits of FIGS. 1 or 3 for obtaining visual indication of the diode test results, and FIG. 6 is a schematic block diagram of a testing system for obtaining test results in binary logic form from a voltage comparison circuit according to the invention.

*Description of the Voltage Comparison Apparatus of FIG. 1*

The voltage comparison circuit of FIG. 1 provides for comparing the forward resistance of a semiconductor diode 10 to the resistance of a calibrating resistor 12. If the resistance of the diode is less than that of the calibrating or standard resistor, the diode passes the test and a series of negative pulses indicating "accept" occurs at the output terminal 29 of the circuit. If the resistance of the diode is greater than that of the standard, the diode fails the test and a series of positive pulses indicating "reject" occurs at the output terminal of the circuit. For testing purposes the resistances of the elements are compared by comparing the voltages obtained by constant current flow through the elements.

A semiconductor diode 10 to be tested is connected between test terminals 11. A regulated D.C. power supply 13 is connected to provide a positive potential to one of the terminals through a resistance 14. The other test terminal is connected to the ground terminal of the power supply. The connection between the resistance and the terminals is labeled point A in the drawing. The positive terminal of the power supply 13 is also connected to ground through a parallel resistance network including a resistance 15 and a potentiometer 16. A resistance 17 is connected between point A and a stationary contact 20 of a synchronously driven single pole, double throw electromechanical switch 21 commonly called a "chopper." The other stationary contact 22 of the chopper is connected through a resistance 23 to the moveable contact of the potentiometer 16. The moveable contact is labeled point B on the drawing. The moveable or vibrating contact 24 of the chopper is connected through a capacitor 25 to ground. The vibrating contact 24 is caused to reciprocate between the two stationary contacts by an A.C. power supply 26, the frequency of which is the switching frequency of the chopper. When the vibrating contact 24 of the chopper is in contact with stationary contact 20, it is considered to be in position 1 for the purposes of this discussion. When it is in contact with stationary contact 22, it is considered to be in position 2. An output circuit including a series connected coupling capacitor 27 and a shunt resistance 28 is connected to the stationary contact 22. This connection is labeled point C on the drawing, and the output terminal 29 of the circuit is labeled point D.

*Calibration and Operation of the Voltage Comparison Apparatus of FIG. 1*

In order to prepare the apparatus for testing the forward resistance of a diode, a calibrating resistor 12 having a resistance equal to the maximum desired resistance of an acceptable diode is placed between the test terminals 11. A resistor 14 of a suitable value is chosen to provide approximately the desired current flow through the calibrating resistor. The voltage of the power supply 13 is sufficiently large so that the value of the resistance 14 can be made very large compared to that of the calibrating resistor 12, and an essentially constant current is thus obtained. With resistors 12 and 14 in position, minor adjustment is made of the output voltage of power supply 13 in order to obtain exactly the desired current flow through the calibrating resistor 12. The moveable contact of the potentiometer 16 is then adjusted to give a null reading at point D in the output circuit. The manner in which the circuit operates to provide output signals will be apparent from later discussions herein. A null reading indicates that the potential at point A is equal to that at point B. The voltage across the potentiometer from the moveable contact at point B to ground may then be considered as the reference voltage and the calibrating resistor is removed from its position interconnecting the test terminals.

The manner of operation of the circuit with a diode 10 properly connected between the test terminals 11 may best be described in conjunction with the curves of FIGS. 2A and 2B. If the diode has a forward resistance less than that of the calibrating resistor 12 which the diode has replaced between the test terminals, the voltage across the diode is less than the reference voltage. That is, point A is at a lower potential than point B. Under these conditions when the chopper vibrating contact is in position 1, the capacitor 25 becomes charged to the voltage across the diode. The potential at point C is the same as that at point B as shown in the first curve of FIG. 2A. As the vibrating contact changes to position 2, the potential on the capacitor 25 changes rapidly to the reference potential at B creating a negative going pulse at point C. This action is repeated for each complete cycle of the chopper thus producing a series of negative going pulses at point C. The pulses at point C are A.C. coupled to the output terminal to produce a series of negative pulses at point D, as shown in the second curve of FIG. 2A. Thus, negative pulses at the output terminal indicate that the resistance of the diode is less than that of the calibrating resistor and that the diode is to be accepted.

If the diode under test has a forward resistance greater than that of the calibrating resistor 12, the voltage across the diode is greater than the reference voltage, and point A is at a higher potential than point B. The capacitor 25 becomes charged to the potential at point A when the chopper vibrating contact is in position 1, and discharges rapidly to the potential at point B when the vibrating contact is in position 2. As the vibrating contact moves into position 2, a positive going pulse thus occurs at point C as shown in the first curve of FIG. 2B. The positive pulses at point C appear as positive pulses at the output terminal, point D. Thus, positive pulses at the output terminal indicate that the forward resistance of the diode is greater than the standard and that the diode is to be rejected.

*Description of the Voltage Comparison Apparatus of FIG. 3*

An alternate form of apparatus according to the invention for testing the forward resistance of diodes is shown in FIG. 3. A semiconductor diode 40 is connected into the test circuit between the test terminals 41. A calibrating resistor 42 is connected across the test terminals while the apparatus is being calibrated prior to testing. A D.C. potential is applied to the diode from a regulated power supply 43 connected across the test terminals. The positive terminal of the power supply is connected to the diode through a resistance 44. The connection between the resistance and the diode is labeled point E on the drawing. A parallel path from the power supply to ground is provided through resistance 45 and potentiometer 46. A resistance 47 is connected between point E and a stationary contact 50 of a chopper 51. The other stationary contact 52 of the chopper is connected through a resistance 53 to the moveable contact of the potentiometer 46. The moveable contact is labeled point F on the drawing. The vibrating contact 54 of the chopper is connected directly to the stationary contact 52. When the vibrating contact is in contact with the stationary contact 52 it is considered to be in position 1. When it is in contact with stationary contact 50, it is considered to be in position 2. The vibrating contact 54 is operated by an A.C. power supply or driver 56. A capacitor 55 is connected between stationary contact 50 labeled point G on the drawing, and ground. An output circuit including a series connected coupling capacitor 57 and a shunt connected resistance 58 is connected to point G. The output terminal 59 is labeled point H on the drawing.

*Calibration and Operation of the Voltage Comparison Apparatus of FIG. 3*

In order to utilize the apparatus of FIG. 3 for determining whether a diode under test has a forward resistance above or below a desired maximum value, a calibrating resistor 42 of the desired maximum value is connected between the test terminals 41. A resistor 44 is chosen to provide approximately the proper current flow through the calibrating resistor 42 and the power supply 43 is adjusted for exactly the proper current flow through the calibrating resistor. The moveable contact of the potentiometer is then adjusted to provide a null reading at the output of the circuit, and the resulting voltage at point F becomes the reference voltage.

The manner in which the circuit of FIG. 3 operates with a diode 40 connected across the test terminals 41 may best be described in conjunction with the curves of FIGS. 4A and 4B. If the diode has a forward resistance less than that of the calibrating resistor, the voltage across the diode is less than the reference voltage. That is, the potential at point E is lower than that at F. When the chopper vibrating contact is in position 1, the capacitor 55 assumes the voltage across the diode. The time constant of the resistance 47-capacitance 55 combination is such that the potential at point G becomes approximately the same as that at point E near the end of the period the vibrating contact is in position 1, as is shown in the first curve of FIG. 4A. The time constant of the combination is approximately one-fifth of the time the vibrating contact remains in position 1. When the vibrating contact moves to position 2, the potential at point G changes to assume the potential at point F. The time constant of the resistance 53-capacitance 55 combination is small in relation to that of the resistance 47-capacitance 55 combination, and the potential at point G changes rapidly as shown in the first curve of FIG. 4A. This rapid positive going potential at point G is differentiated by the output circuit to produce a positive pulse at the output terminal 59. The resulting potentials occurring at point H are shown in the second curve of FIG. 4A. Thus, for the circuit of FIG. 3 positive pulses at the output terminal indicate that the forward resistance of the diode is less than that of the calibrating resistor and that the diode is to be accepted.

If the diode 40 under test has a forward resistance greater than that of the calibrating resistor 42, the voltage across the diode is greater than the reference voltage, and point E is at a higher potential than point F. When the vibrating contact 54 of the chopper is in position 1, the capacitor 55 charges to the voltage across the diode as shown in the first curve of FIG. 4B. As the vibrating contact moves to position 2, the capacitor discharges very rapidly to the potential at point F. The pulses at point G are differentiated by the output circuit and a series of negative pulses appear at point H as shown in FIG. 4B of the drawing. Thus, negative pulses at the output terminal indicate that the forward resistance of the diode is greater than that of the calibrating resistor and that the diode is to be rejected.

*Amplifier and Indicator Apparatus of FIG. 5*

The information in the form of electrical pulses as obtained from the voltage comparison circuits of FIGS. 1 or 3 may be utilized in various ways. The apparatus of FIG. 5 may be used with either of the test circuits to provide a visual indication of whether the diode under test should be accepted or rejected on the basis of the forward resistance test performed. Included in the apparatus is an amplifier section 70 which provides a signal of positive polarity on one or the other of two output lines depending on whether the input signal is positive or negative. An indicator section 71 utilizes the amplifier output to fire one of two thyratrons, and thus light one of two indicating lamps to provide the visual indication of "accept" or "reject." Since the "accept" or "reject" signals from the comparison circuits of FIGS. 1 and 3 are of opposite polarities for the same test results, which of the lamps is designated as "accept" and which is designated as "reject" depends on the particular voltage comparison circuit employed. As long as this distinction between the significance of the final signals is recognized, the test circuits are interchangeable for providing inputs to the apparatus of FIG. 5.

Description of Amplifier Section

The amplifier section 70 of the apparatus includes two duo-triodes arranged in four amplification stages and one duo-triode for providing two cathode follower output stages. An input terminal 72 is connected to the control grid of the first section 73a of a duo-triode. The output of this stage is taken from the anode and applied through a resistance-capacitance coupling network to the control grid of the second section 73b of the duo-triode. The output from the anode of this stage is applied through a coupling network to the grid of the first section 74a of the second duo-triode. From this stage the output is taken at the anode and applied to the grid of the second section 74b of the second duo-triode. This output is also applied through a resistance-capacitance coupling network to the grid of the first section 75a of the cathode follower duo-triode. The output of the second section 74b of the second duo-triode is applied to the grid of the second section 75b of the cathode follower duo-triode through a resistance-capacitance network. The anodes of the four amplifying stages are connected through load resistors to the positive terminal of a suitable D.C. power supply 80. Cathode biasing resistors in parallel with by-pass condensers connect the cathodes of the four amplifying stages to ground. The anodes of the cathode follower stages are connected directly to the power supply 80. Cathode follower load resistances 81 and 82 are connected between the cathode of the triode sections 75a and 75b respectively and ground. A first output line 83 is connected to the cathode of the first cathode follower stage 75a, and a second output line 84 is connected to the cathode of the second cathode follower stage 75b.

Operation of Amplifier Section

A series of negative pulses applied to the amplifier input terminal 72 are amplified and inverted by stages 73a, 73b, and 74a and then applied to the first cathode follower stage 75a. The output of this stage at the first output line 83 is a series of positive pulses. The signal from stage 74a is also amplified and inverted once more by amplifier stage 74b and then applied to the second cathode follower stage 75b. The output of this stage at the second output line 84 is a series of negative pulses. Positive pulses applied to the input terminal 72 are similarly amplified and inverted, and, therefore, produce positive pulses on the second output line 84 and negative pulses on the first output line 83.

Description of Indicator Section

The indicator section 71 of the apparatus of FIG. 5 provides both visual and electrical indication as to which of the two amplifier output lines 83 or 84 carries positive pulses. The first output line 83 from the amplifier section is connected through a coupling capacitor 92 to the first grid of a first thyratron 90. The second output line 84 is connected through a capacitor 93 to the first grid of a second thyratron 91. Each of thyratron cathodes is grounded. The anode of the first thyratron 90 is connected to its cathode through a series circuit including the secondary winding of transformer 94, a first indicator lamp 95, and a resistance 96. The anode to cathode circuit of the second thyratron 91 includes the secondary winding of a transformer 97, a second indicator lamp 98, and a resistance 99. The second grid of each thyratron is connected directly to the point between the indicator lamp and resistance in the anode-cathode circuit of the other thyratron. A source of A.C. potential 100 is connected in parallel to the primary windings of the two transformers. The output of this power supply is in phase with that of the A.C. power supply 26 or 56 which drives the chopper in the comparison test circuit of FIGS. 1 or 3, so that input pulses to the first grids of the thyratrons occur while the positive half cycle of the A.C. voltage is being applied to the anodes. A first output terminal 101 is provided between the first indicator lamp 95 and the resistance 96, and a second output terminal 102 is provided between the second indicator lamp 98 and resistance 99. A D.C. power supply 103 provides a negative bias to the first grids of the first and second thyratrons through resistances 104 and 105 respectively.

Operation of Indicator Section

As explained hereinabove, when a series of negative pulses is applied to the input terminal 72 of the amplifier section 70, a series of positive pulses appears on the first output line 83 and a series of negative pulses appears on the second output line 84. Since the A.C. power supply 100 for the thyratrons 90 and 91 is in phase with the A.C. power supply 26 or 56 which drives the chopper, these pulses are of the same frequency as the power supply 100 and occur while the thyratron anodes are positive. Each positive pulse on the first output line 83 overcomes the bias on the first grid and triggers the first thyratron 90. The second thyratron 91 does not fire since the pulses on the second output line 84 are negative. Current flows through the anode-cathode circuit of the first thyratron 90 during the half cycle that the anode remains positive. This current causes the first indicator lamp 95 to light, and creates a negative pulse at the first output terminal 101. This negative potential is also applied to the second grid of the second thyratron 91 assuring that the second thyratron will not fire while the first one is conducting. Thus, a series of negative pulses at the input terminal 72 causes the first indicator lamp 95 to light and causes a series of negative pulses to appear at the first output terminal 101.

When a series of positive pulses is applied to the input terminal 72 of the amplifier section 70, a series of positive pulses appears on the second output line 84 and a series of negative pulses appears on the first output line 83. The action of the two thyratrons and their associated indicator lamps and output terminals is reversed over that previously described. The second thyratron 91 is fired and the first thyratron 90 remains cut-off. Thus, a series of positive pulses at the input terminal 72 causes the second indicator lamp 98 to light and causes a series of negative pulses to appear at the second output terminal 102.

Summary of Operation of Amplifier and Indicator Apparatus

Operation of the amplifier and indicator apparatus of FIG. 5 in conjunction with the test comparison circuits of FIGS. 1 or 3 for testing the forward resistance of semiconductor diodes may be summarized as follows. If a diode under test in the circuit of FIG. 1 has a forward resistance less than that of the calibrating resistor and is to be accepted, a series of negative pulses appears at output terminal 29. These pulses are applied at the input terminal 72 of the amplifier section 70, and appear as positive pulses at the first output line 83 and negative pulses at the second output line 84. In the indicator section 71 the first thyratron 90 fires, and the first indicator lamp 95 lights to indicate "accept." If the resistance of the diode in the test circuit of FIG. 1 is high and the diode is to be rejected, a series of positive pulses appear at the output terminal 29, and are applied to the amplifier input terminal 72. In this case positive pulses appear on the second output line 84 and negative pulses on the first output line 83, thereby firing the second thyratron 91 and lighting the second indicator lamp 98 to indicate "reject."

With the circuit of FIG. 3 employed in place of that of FIG. 1, positive pulses at its output terminal 59 indicate an acceptable diode and negative pulses a diode to be rejected. Therefore, in the indicator section the second lamp 98 lights to indicate "accept" and the first lamp 95 lights to indicate "reject."

As an example of a typical application of apparatus according to the invention, the test circuit of FIG. 1 has been employed with the amplifier and indicator circuits of FIG. 5 for testing the forward resistance of Sylvania type 1N456 silicon diodes. It is specified for diodes of this type that when a forward current of 40 milliamperes is passed through a diode, the voltage across the diode must be equal to or less than 1.0 volt. That is, the forward resistance of the diode must be equal to or less than 25 ohms when the diode is conducting 40 milliamperes.

For this test a constant voltage D.C. power supply 13 of 300 volts is used. The electro-mechanical switch or chopper 21 is driven by a 60 cycle per second A.C. power supply 26 of 6.3 volts. The vibrating contact makes contact with each of the stationary contacts for over 45% of each cycle and its total transit time is, therefore, less than 10% of each complete cycle. There is a phase lag of approximately 25° after the voltage changes polarity before the vibrating contact changes position. A resistor of 7500 ohms is chosen for resistance 14 in order to provide a current flow of approximately 40 milliamperes. The values of the other resistances and capacitances in the circuit of FIG. 1 are as follows:

| | |
|---|---|
| Resistor 15_____kilo-ohms__ | 300 |
| Potentiometer 16_____ohms__ | 1,300 |
| Resistor 17_____kilo-ohms__ | 250 |
| Resistor 23_____do____ | 43 |
| Resistor 28_____do____ | 100 |
| Capacitor 25_____micro-farads__ | .01 |
| Capacitor 27_____micro-micro-farads__ | 3,300 |

The amplifier section 70 of FIG. 5 includes two type 5691 duo-triode tubes in the four amplifying stages. Each uses a 4,700 ohm cathode biasing resistor and has a 300 kilo-ohm load resistor connected from the anode to a 300 volt power supply 80. Conventional resistance-capacitance coupling is used between the amplifying stages. The two cathode follower stages employ a type 5692 duo-triode tube and cathode follower resistors 81 and 82 of 22 kilo-ohms each. The thyratrons 90 and 91 in the indicator section 71 are type 2D21 and are connected to the cathode followers through coupling condensers 92 and 93 of .02 micro-farad each. A.C. power supply 100 through the transformers 94 and 97 applies 180 volts peak at a frequency of 60 cycles per second to the thyratron anodes. The indicator lamps 95 and 98 are 6 watt, 120 volt incandescent lamps. The bias supply 103 biases the first grids of the thyratron at about 9 volts negative through resistors 104 and 105 of 100 kilo-ohms each.

The circuit of FIG. 1 is first adjusted with a precision calibrating resistor 12 of 25 ohms connected between the test terminals 11. The regulated power supply 13 is adjusted to provide a current flow of exactly 40 milliamperes through the calibrating resistor. The center tap of the potentiometer 16 is then positioned so that both indicator lamps 95 and 98 are off, thus indicating that a null has been achieved and points A and B are at the same potential. The calibrating resistor 12 is then removed from the test circuit and diodes may be tested. The first indicator lamp 95 lights to indicate "accept" and the second indicator lamp 96 lights to indicate "reject." In the rare event that a diode has exactly the same resistance as the calibrating resistor, neither lamp lights. A marginal unit which should be rejected is thus indicated.

The apparatus of FIGS. 1 and 5 as described above is capable of detecting a potential difference between points A and B as small as 1.0 millivolt. The gain of the amplifier section is such that output pulses of 10 volts are obtained with input pulses of 1.0 millivolt. The output at the indicator section output terminals 101 or 102 is a series of pulses of approximately 100 volts negative.

*Test Apparatus of FIG. 6*

FIG. 6 is a block diagram indicating the usefulness of the invention for the fully automatic testing of components and for obtaining data for quality analysis purposes. A comparison test circuit 120 according to the invention provides a signal consisting of a series of positive or a series of negative pulses; pulses of one polarity indicating "accept," those of the opposite polarity indicating "reject." The signal is amplified by a suitable amplifying circuit 121 which may be similar to that of FIG. 5. The amplifier in conjunction with an indicating circuit 122 provides an output signal of a series of pulses to indicate "accept" and no signal to indicate "reject." These results can be obtained from the indicator section 71 of FIG. 5 by taking the output from either output terminal 101 or 102, whichever is connected to the "accept" indicator lamp. The output from the indicating circuit is fed into a pulse forming circuit 123. This signal, or lack of signal, is utilized together with suitable pulse forming and timing circuits to produce a single square wave pulse to indicate "accept" for the diode under test, and no pulse to indicate "reject." Thus, the test results on the diode are translated into binary logic values; a "1" for "accept" or a "0" for "reject." The information in binary form can be utilized to actuate various electro-mechanical switches and other devices in automatic equipment, and can be stored, transferred, and otherwise processed according to logical computer techniques.

It can be seen that voltage comparison circuits according to the invention provide for rapidly and precisely determining whether the voltage across an element is greater or less than standard reference voltage. The usefulness of these circuits for testing the forward resistance of semiconductor diodes in a semi-automatic manner without the exercise of human judgment has been specifically indicated, and their utility in fully automatic equipment and for testing to other parameters is believed apparent. Obviously, the invention is not limited to use with semiconductor diodes, but may be employed in the testing of other types of electrical components and wherever comparison in terms of a reference voltage is possible.

What is claimed is:

1. Apparatus for comparing the electrical voltages across two elements, including in combination a first element having a voltage thereacross, a second element having a voltage thereacross, an electrical energy storage means, means for charging said storage means to the voltage across one of said elements, means for periodically connecting the other of said elements to the storage means for rapidly changing the voltage across said storage means to the voltage across the other of said elements within a small portion of the period the other of said elements is connected to the storage means, and output means responsive to the rapidly changing voltage across said storage means.

2. A bridge circuit for comparing the voltage across an element with the voltage across another element, including in combination a first element having an electrical voltage thereacross, a second element having an electrical voltage thereacross, and a detector circuit connected to each of said elements, said detector circuit including a capacitor and switching means for alternately charging said capacitor to the voltage across said first element and connecting said capacitor to the second element to change the voltage across said capacitor to the voltage across said second element, operating means associated with the switching means for causing said switching means to connect the capacitor to the second element for a period of time which is long relative to the time for changing the voltage across the capacitor to the voltage across the second element and for causing the switching means to disconnect the capacitor from the second element and to charge the capacitor to the voltage across the first element at the end of said period, said detector circuit also including output means responsive to the change in voltage across said capacitor from the voltage across said first element to the voltage across said second element.

3. Apparatus for determining whether an unknown voltage is greater or less than a known voltage, including in combination a first element having an unknown voltage thereacross, a second element having a known voltage thereacross, a capacitor, a vibrating switch, means including said switch for alternately charging the capacitor to the unknown voltage and connecting the capacitor to the second element to change the voltage across the capacitor to the known voltage within a small portion of the time the capacitor is connected to the second element, and an output circuit including a resistance-capacitance network for applying to an indicating means signals derived from the changing of the voltage across said capacitor from the unknown voltage to the known voltage.

4. Apparatus for comparing the voltage across an element with the voltage across another element, including in combination a first element having an electrical voltage thereacross, a second element having an electrical voltage thereacross, a capacitor, a switch having a movable contact connected to said capacitor, said switch connecting the first element to the capacitor when the movable contact of said switch is in a first position thereby charging the capacitor to the voltage across said first element and said switch connecting the second element to the capacitor when the movable contact of said switch is in a second position thereby charging the capacitor to the voltage across said second element through a direct current path, driving means for periodically moving said movable contact between said first and second positions, the capacitance of said capacitor and the impedance of said direct current path being related to permit the voltage across said capacitor to change from the voltage across said first element to the voltage across said second element within a small portion of the period said driving means permits the movable contact of said switch to remain in said second position, and an output network connected through an impedance to said second element and connected directly to said capacitor when said movable contact is in said second position whereby an output signal is produced in said output network as said movable contact is placed in the second position and the voltage across said capacitor is applied to said output network.

5. Apparatus for determining whether an unknown voltage is greater or less than a known voltage, including in combination a first element having an unknown voltage thereacross; a second element having a known voltage thereacross; a capacitor; a switch having a first stationary contact connected through a first resistance to the first element, a second stationary contact connected through a second resistance to the second element, and a movable contact connected to the capacitor; driving means for periodically moving said movable contact between said first and second stationary contacts whereby the voltage across said capacitor alternates between that across said first element and that across said second element; the time constant of the capacitor and second resistance being small relative to the period said driving means permits the movable contact of said switch to contact said second stationary contact; and a resistance-capacitance circuit connected to said second stationary contact whereby a signal is produced at the output of said resistance-capacitance circuit as said movable contact contacts said second stationary contact and the voltage across said capacitor rapidly changes from that across said first element to that across said second element.

6. Apparatus for determining whether the forward voltage across a semiconductor diode is greater or less than a predetermined reference voltage, including in combination a semi-conductor diode under test; a first resistance; a capacitor; the negative terminal of said diode, one terminal of said resistance, and one terminal of said capacitor being connected to ground; a D.C. power supply providing a positive potential to a resistance connected to the positive terminal of said diode and to a resistance connected to the other terminal of said first resistance whereby a forward voltage is obtained across said diode and a reference voltage is obtained across said first resistance; a reciprocating switch having a first stationary contact, a second stationary contact, and a movable contact; the first stationary contact being connected to the positive terminal of said diode through a resistance, the second stationary contact being connected to said other terminal of the first resistance through a resistance, and the movable contact being connected to the other terminal of said capacitor; A.C. driving means for periodically positioning said movable contact in contact with said first stationary contact and in contact with said second stationary contact whereby said capacitor becomes alternately charged to the voltage across said diode and to the voltage across said first resistance; an output circuit connected directly to said second stationary contact whereby a signal is produced in said output circuit as said movable contact contacts said second stationary contact and the voltage across said capacitor changes from that across said diode to that across said first resistance; an amplifier connected to said output circuit; a first amplifier output taken from an odd stage of said amplifier; and a second amplifier output taken from an even stage of said amplifier; said first amplifier output being connected to a first thyratron having a first indicator lamp in its anode circuit; said second amplifier output being connected to a second thyratron having a second indicator lamp in its anode circuit; whereby if the voltage across said diode is less than that across said first resistance, a negative signal appears in said output circuit and a positive signal appears in said first amplifier output thus firing said first thyratron and lighting said first indicator lamp; and whereby if the voltage across said diode is greater than that across said first resistance, a positive signal appears in said output circuit and a positive signal appears in said second amplifier output thus firing said second thyratron and lighting said second indicator lamp.

7. Apparatus for determining whether an unknown voltage is greater or less than a known voltage, including in combination a first element having an unknown voltage thereacross; a second element having a known voltage thereacross; a capacitor; a first resistance connecting said first element to said capacitor; a switch having a stationary contact connected to said capacitor and a movable contact connected through a second resistance to said second element; the time constant of the first resistance and the capacitor being large compared to the time constant of the second resistance and the caapcitor; driving means for periodically moving said movable contact into and out of contact with said stationary contact whereby said capacitor charges to the unknown voltage while said movable contact is out of contact with said stationary contact and changes rapidly to the known voltage when said movable contact contacts said stationary contact; and a resistance-capacitance circuit connected to said capacitor whereby as the voltage across said capacitor changes from the unknown voltage to the known voltage an output signal is produced at the output of the resistance-capacitance circuit.

References Cited in the file of this patent

UNITED STATES PATENTS

| | | |
|---|---|---|
| 2,798,198 | Dauphinee | July 2, 1957 |
| 2,822,518 | Jordon | Feb. 4, 1958 |
| 2,889,518 | Hudson et al. | June 2, 1959 |